United States Patent [19]

O'Sullivan et al.

[11] Patent Number: 4,589,370

[45] Date of Patent: May 20, 1986

[54] MOLLUSC CULTURE

[75] Inventors: Brendan W. O'Sullivan, Dublin, Ireland; Leo J. Leggett, Salisbury East; Maxwell V. Melvin, Brighton, both of Australia

[73] Assignees: ICI Australia Limited, Melbourne; State of South Australia, Adelaide, both of Australia

[21] Appl. No.: 750,666

[22] PCT Filed: Apr. 2, 1982

[86] PCT No.: PCT/AU82/00047

§ 371 Date: Aug. 4, 1982

§ 102(e) Date: Aug. 4, 1982

[87] PCT Pub. No.: WO82/03532

PCT Pub. Date: Oct. 28, 1982

Related U.S. Application Data

[63] Continuation of Ser. No. 406,243, Aug. 4, 1982, abandoned.

[30] Foreign Application Priority Data

Apr. 2, 1982 [AU] Australia ............................. PE8394

[51] Int. Cl.⁴ .............................................. A01K 61/00
[52] U.S. Cl. ....................................................... 119/4
[58] Field of Search .................................. 119/2, 3, 4

[56] References Cited

U.S. PATENT DOCUMENTS

| 3,196,833 | 7/1965 | Glancy | 119/4 |
| 3,418,138 | 12/1968 | Dennis et al. | 119/4 |
| 3,486,486 | 12/1969 | Vanderborgh, Jr. et al. | 119/4 |
| 3,495,573 | 2/1970 | Vanderborgh, Jr. et al. | 119/4 |
| 3,517,648 | 6/1970 | Budge | 119/4 |
| 3,526,209 | 9/1970 | Budge et al. | 119/4 |
| 3,641,982 | 2/1972 | Woodridge et al. | 119/4 |
| 3,701,338 | 10/1972 | McMillin | 119/4 |
| 4,052,960 | 10/1977 | Birkbeck et al. | 119/3 |
| 4,438,725 | 3/1984 | O'Sullivan et al. | 119/4 |

Primary Examiner—Hugh R. Chamblee
Attorney, Agent, or Firm—Cushman, Darby & Cushman

[57] ABSTRACT

Method of growing molluscs, such as oysters, which method comprises placing a bed of discrete oysters in a vessel through which a stream of a culture medium is caused to flow upwardly and wherein the flow rate is sufficient to maintain the oysters in suspension without causing turbulent movement in the bed.

15 Claims, No Drawings

MOLLUSC CULTURE

This is a continuation, of application Ser. No. 406,243, filed Aug. 4, 1982, which was abandoned upon the filing hereof.

TECHNICAL FIELD

The present invention relates to a process of cultivating oysters, in particular "cultchless" and "microcultch" oysters. The cultivation of oysters has been practised by man for a long time. Traditionally oyster larvae are induced to settle on a solid substrate, known as cultch. The settled larvae known as spat or seed oysters are then put into oyster beds where they are cultivated until they grow to a marketable size.

The cultch may take various forms ranging from old oyster shells to wooden frameworks. Within the last twenty years new processes for growing seed oysters have been developed. Of particular interest are those which give rise to "cultch-less" or "microcultch" spat.

BACKGROUND ART

A method and apparatus for growing "cultchless" oyster spat is disclosed in U.S. Pat. No 3,526,209 (Budge). The method involves causing free swimming oyster larvae to settle on a relatively smooth surface, such as a sheet made of plastic material. After the larvae have passed through metamorphosis to become oyster spat, they are removed from the sheet to provide "cultchless" oyster spat. These may then be put into tanks where they are maintained in a suspended state either by air-agitation, as disclosed in British Pat. No. 1,366,394 (Scottish Sea Farms Limited), or by upward flow of the culture medium, as disclosed in U.S. Pat. No 3,517,648 (Budge), until they have reached a size large enough to be put into oyster beds for growing to an adult size.

The process of growing "microcultch" spat is described in our copending International Patent Appln No. PCT/AU82/00013. In this process the oyster larvae are induced to settle on small solid particles within a defined particle size range. Definition of the particle size range within close limits allows particles occupied by settled larvae to be separated from unoccupied particles by a simple screening operation. The occupied particles are then maintained in a suspended state in a manner as previously described until the attached spat are 4 mm in size which is large enough for them to be used as seed oysters.

One method of growing "cultchless" and "microcultch" seed oysters to adult size and cultivating them thereafter to a marketable condition is to enclose them in mesh bags which are then immersed in the sea or estuaries. As the oysters grow so they need to be transferred to bags of successively larger mesh. The largest mesh size which will retain the oysters is desirable in order to obtain maximum accessibility of the sea water to the oysters. Such a method has its shortcomings, such as the high labour involved in rebagging the oysters and the need to remove the fouling materials which grow on and around the bags.

DISCLOSURE OF INVENTION

We have now found another method of cultivating to maturity discrete oyster seed, as typified by "cultchless" and "microcultch" oyster seed, in which a bed of such seed is contained in a tank of sea water in which there is an upward flow of the sea water, sufficient to produce incipient suspension but not so great as to produce turbulence.

Accordingly the present invention provides a process of cultivating oysters wherein a bed of discrete oysters is placed in a vessel through which a stream of a culture medium is caused to flow upwardly and wherein the flow rate of said stream is at least that required for the oysters in the bed to be in a state of incipient suspension and is less than that which causes turbulent movement in the bed.

We use the term oyster to refer to all post free-swimming-larval stages in the life cycle of the oyster. Examples of the species of oysters to which the process of this invention is applicable include:

British or flat oyster—*Ostrea edulis*
Mud oyster—*O. angasi*
Pacific oyster—*Crassostrea gigas*
Sydney rock oyster—*C. commercialis*
Slipper oyster—*C. eradelie*
Mangrove oyster—*C. rhyzophorae*
Eastern American oyster—*C. virginica*
Portuguese oyster—*C. angulata*

By discrete oysters we mean separate individual oysters which are unattached to any cultch particle or are attached to separate small particles of cultch which are less than 400 microns in size. Discrete oysters which are at least 4 mm in size are suitable for use in the process but it is within the scope of this invention that the process may be applied to any sized oyster between 4 mm and adult size. Preferably the process is applied to oysters greater than 15 mm. The culture medium is suitably a saline solution having a salinity between 0.1 and 5% w/v and containing nutrients required for the growth of oysters. A preferred culture medium is sea water.

Oysters feed by filtering the nutrients they require from the medium in which they are growing. They are dependent on the nutrients being presented to them by means of the flow of the medium across them. The process of the invention provides the opportunity to control the flow of the medium across the growing oyster as well as the nature of the medium itself. This flow is considerably greater than occurs in traditional oyster bed situations. We have achieved a higher growth rate in oysters cultivated by the process of the invention than that obtained in traditional oyster beds. Without prejudicing the scope of this invention by theory it would appear that this high growth rate occurred because of the faster rate of presentation of nutrients to the oysters.

It follows from growth rate considerations only, that the faster, within practicable limits, the flow rate of the culture medium through the bed the better. However in the process of the invention the flow rate of the culture medium is dependent upon the size of the oysters being cultivated and the shape and dimensions of the vessel containing the bed of oysters.

Young separate oysters are generally dimensionally isotropic. However as they grow towards the adult stage their dimensions become progressively more anisotropic. This effect for oysters of the species *C. gigas*, for example, becomes marked at about 15 mm. A bed of these oysters less than 15 mm in size when subjected to an increasing upward flow of culture medium will behave as though it were a fluidized bed when the velocity of the culture medium flowing up through the bed is such that the fluid drag force (ie pressure drop x vessel cross-sectional area) is equal to or greater than the weight of the particles. However when the oysters are dimensionally anisotropic stable fluidization is difficult to achieve. If the flow rate of the culture medium up through a bed of discrete oysters which are dimensionally anisotropic, is varied from zero there is a range of flow rates at which incipient suspension occurs and the oysters tend to float with their surface of greatest cross-sectional area at right angles to the direction of flow. In this bed condition the pressure exerted by the upper oysters on the lower if the bed were static is reduced so that they are able to grow freely and the tendency to intergrowth which is exhibited by oysters when in contact with other oysters is reduced. Such intergrowth is undesirable because it results in mis-shapen oysters of lower market value. If the flow rate is increased too high the oysters no longer float but tend to change their orientation in the bed so that the surface at right anbles to the flow is one of a lower surface area, this results in collapse of the bed and creation of turbulent conditions.

Vessels in which the process of the invention is carried out are suitably ones which have an inlet for the culture medium situated below a screen of mesh size slightly smaller than the smallest oysters being cultivated in the vessel. The off-take from the vessel is at a suitable height above the screen so that the oysters in the bed above the screen when the culture medium is flowing through it are not carried out of the vessel. Vessels of the type described in International Appln No. PCT/AU82/00013 are particularly stable. As a further precaution the off-take may be fitted with a mesh screen to prevent over-flow of the oysters from the vessel. It is important, for the reasons given above, that means are provided for control of the flow of the culture medium; conveniently this takes the form of a pump operated with a constant head which head can be varied depending on the size of the oysters in the bed.

BEST MODE OF CARRYING OUT THE INVENTION

We have observed that if a bed of oysters of widely varying sizes is cultivated according to the process of the invention, the larger oysters grow at a much greater rate than and at the expense of the smaller ones. Therefore it is preferable for the oysters in the bed to be within a close size range. This may be achieved by interrupting the process of the invention and separating from the bed the oversize and undersize oysters and transferring them to beds composed of oysters of similar size. Accordingly in a further embodiment of the invention we provide a process of cultivating oysters by an incipient suspension process, as hereinbefore described, wherein the process comprises the additional step of regular screening of the bed of oysters to separate from the bed those oysters which vary in size from the mean size of oyster in the bed by more than 10 mm so that the size range variation in the bed is not greater than 20 mm. Preferably the screening process is such that the size range variation in the bed is not greater than 10 mm.

The process of the present invention involves the use of apparatus consisting of tanks or similar vessels fitted with a mesh floor to support the bed of growing oysters and up through which the culture medium is caused to flow. The aperture size of the mesh floor is preferably as large as possible in order to minimise any hindrance to the flow of the culture medium yet not larger than the size of the individual oysters in the bed.

The use of this apparatus and the control of the flow of the culture medium permits useful additions to be made to the basic process of the invention. These additional processes give rise to benefits which include control of the flavour, spawning behaviour and growth of the oysters and their preparation for market. The benefits are very difficult to achieve with traditional processes of oyster cultivation in the sea or estuary.

The salinity of the culture medium has a marked influence on the flavour of oysters. It is convenient in the content of the present invention to vary the salinity of the culture medium by any known means and thus achieve a desired flavour for the oysters grown therein. Accordingly in yet a further embodiment of the invention we provide a process of cultivating oysters by an incipient suspension process, as hereinbefore described, wherein the salinity of the culture medium is varied to impart a desired flavour to the oysters grown therein.

It is convenient using the apparatus involved in the execution of the process of the invention to add special additives to the culture medium; such additives include, for example, spawning inhibitors and accelerators, additional nutrients and growth modifiers. In a further embodiment of the process of our invention we provide a process of cultivating oysters by an incipient suspension process, as hereinbefore described, wherein special chemicals such as spawing inhibitors and accelerators and growth modifiers are added to the culture medium prior to the culture medium being passed through the bed of oysters.

It is preferable to purify oysters prior to marketing. This is normally achieved by immersing them in a purifying medium which is devoid of contaminating organisms. This purification step is conveniently achieved in the process of the present invention by replacing the culture medium used to grow the oysters by a purification medium. This purification medium can be used repeatedly by a process of sterilizing the effluent purification medium from the bed with U/V irradiation, chlorine, ozone and other means, and recirculating the purification medium to the bed. This purification process is done just prior to harvesting the oysters for the market. Accordingly the present invention provides a process of cultivating purified oysters by an incipient suspension process, as hereinbefore described, wherein immediately prior to harvesting the oysters the culture medium is replaced by a purification medium which is devoid of nutrients.

Preferably the effluent purification medium is sterilized by U/V radiation or chlorine and recirculated to the bed.

Preferably the purification medium is a saline solution having its salinity controlled to impart a desired flavour to the oysters harvested.

Oysters which are cultivated in beds which are in tidal situations such that they are subjected to a cycle of immersion and exposure develop a tight fitting seal between bottom and top shells. This is desirable because oysters having this seal maintain their fresh condition during transport better than those without this seal.

We have now found that if at the end of the process of cultivation of oysters using the process of the present invention the flow of the culture medium or purification medium is interrrupted at intervals and the bed allowed to drain the oysters developed the desired seal. In yet another embodiment of the process of our invention we provide a process of cultivating oysters having a seal by an incipient suspension process, as hereinbefore described, wherein the process comprises interruption of the flow of the culture and/or purification medium at intervals coupled with the draining of the bed of oysters.

INDUSTRIAL APPLICABILITY

The growing oysters give rise to considerable quantities of detritus in the form of faeces and pseudo-faeces. An advantage of the process of this invention is that the continuous flow of the culture medium through the bed flushes the detritus out. It is preferred that the culture medium is not recirculated in the system otherwise there is liable to be an undesirable build up of waste products and the need to provide a source of nutrients and minerals.

As an optional extension to the process of this invention, the faeces and pseudo-faeces in the effluent stream are separated or concentrated by filtration or centrifuging or hydrocycloning. They have potential value as fertilizers for plans or as a nutrient source for animals.

The process of this invention is of particular significance in the context of those operations in which large quantities of sea water are pumped. For example, in operations where sea water is used as a coolant or in the production of salt by solar evaporation.

Sea water is commonly the raw material source in the production of sodium chloride by solar evaporation. The sea water is pumped into a series of ponds in which it slowly loses its water content by solar evaporation until the sodium chloride crystallises out. One tonne of sodium chloride is made from 45 tonnes of sea water, thus solar salt production requires large amounts of sea water to be pumped into the ponds. It is convenient for this sea-water to be passed through vessels containing oysters at such a rate that they are held in a state of incipient suspension and for such a time as is necessary for them to grow to a marketable size.

Claims:

1. A process of cultivating oysters to maturity which comprises placing a bed of discrete oysters at least 4 mm in size in a vessel, flowing a stream of a culture medium upwardly through said vessel so that the flow rate of said stream is at least that required for the said discrete oysters to be kept in incipient suspension and is less than that which causes turbulent movement in the bed, periodically screening the bed of oysters so that the size range variation in the bed is less than 2 mm and continuing said flow through said vessel until the oysters in said vessel reach maturity.

2. A process according to claim 1 wherein the oysters comprise one or more of the species *Ostrea edulis, Ostrea angasi, Crassostrea commercialis, Crassostrea eradelie, Crassostrea rhizophorae, Crassostrea virginica* and *Crassostrea angulator*.

3. A process according to claim 1 wherein the oysters comprise the species *Crassostrea gigas*.

4. A process according to any one of claims 1 to 3 wherein the said discrete oysters comprise cultchless seed oysters.

5. A process according to any one of claims 1 to 3 wherein the said discrete oysters comprise microcultch seed oysters.

6. A process according to claim 1 wherein the size range is greater than 15 mm.

7. A process according to any one of claims 1 to 7 wherein the said culture medium comprises a saline solution having a salinity between 0.1 and 5% w/v.

8. A process according to any one wherein the culture medium is sea water.

9. A process according to claim 1 wherein the size range variation in the bed is less than 10 mm.

10. A process according to claim 1 wherein the oysters are subjected at intervals to interruption in the stream of culture medium or purification medium and draining of trhe bed whereby the oysters develop a seal between the bottom and top shells.

11. A process according to any one of claims 1 to wherein the step of cultivating the oysters is followed by a purification step which comprises replacing the stream of culture medium by a stream of purification medium which is devoid of nutrients.

12. A process according to claim 11 wherein the purification medium is a saline solution having its salinity controlled to impart a desired flavour to the oysters harvested.

13. A process according to claim 11 wherein the purification medium is sterilized by exposure to ultra violet radiation.

14. A process according to claim 11 wherein the purification medium is sterilized by treatment with chlorine.

15. A process according to claim 11 wherein the purification medium is sterilized by treatment with ozone.

* * * * *